J. G. ANGELL.
Sugar-Cooling and Draining Apparatus.

No. 169,223. Patented Oct. 26, 1875.

WITNESSES:
Francis McArdle.
N. F. Terry

INVENTOR:
J. G. Angell
BY
ATTORNEYS.

UNITED STATES PATENT OFFICE.

JOHN G. ANGELL, OF NEW ORLEANS, LOUISIANA.

IMPROVEMENT IN SUGAR COOLING AND DRAINING APPARATUS.

Specification forming part of Letters Patent No. 169,223, dated October 26, 1875; application filed April 17, 1875.

*To all whom it may concern:*

Figure 1:
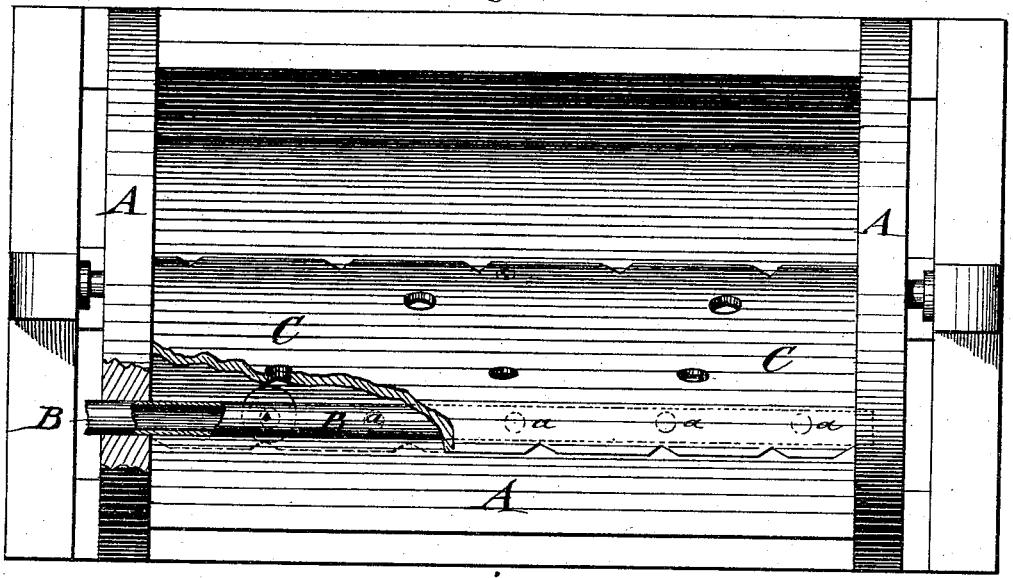
Figure 2:
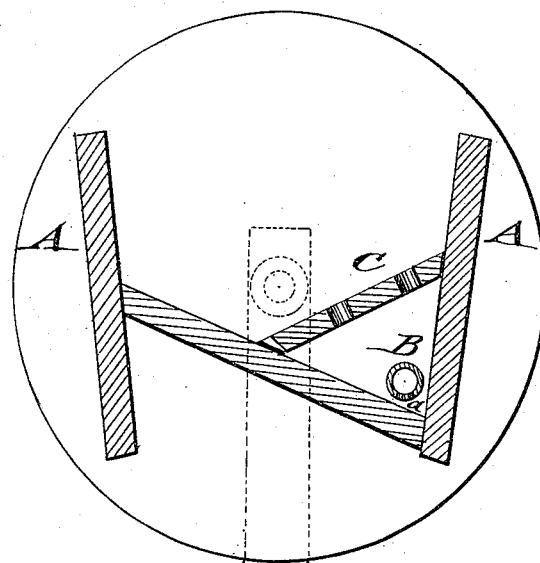

Be it known that I, JOHN G. ANGELL, of New Orleans, parish of Orleans, Louisiana, have invented a new and Improved Sugar Cooler and Drainer, of which the following is a specification:

Figure 1 represents a top view of my improved sugar cooler and drainer, with parts broken away to show construction below; and Fig. 2 is a vertical transverse section of the same.

Similar letters of reference indicate corresponding parts.

My invention relates to an improved sugar cooling and draining device of very simple and effective construction; and it consists of an oblong box or receptacle, with converging sides, inclined bottom, perforated draining-tube, and perforated guard-plate.

In the drawing, A represents an oblong trough-shaped box or receptacle, which is supported on wheels or standards by pivot-pins or gudgeons at the ends, for being readily dumped for emptying the charge through a hopper, or otherwise, into receivers after cooling. The cooling-box A is made with its sides converging from top to bottom, and with a laterally-inclined bottom, a draining-tube, B, being arranged in the lower corner, passing longitudinally through the box, and projecting at both ends, to be closed there by tightly-sealing stoppers. The draining-tube B is perforated by one or more openings, $a$, at the lower side, and covered by an inclined and perforated guard-plate, C.

The converging sides and the inclined bottom serve to convey all the molasses or fluid in the sugar to the lowermost part of the box, where the draining-tube is located. The draining-tube is closed at both ends, for preventing, by the air inclosed therein, the entrance of the hot sugar or other substance until the sugar has granulated, when, by opening the end apertures, the atmospheric pressure is removed, and the molasses or fluid forced into the tube and out at the ends.

The perforated guard-plate protects the draining-tube from injury, and retains the damp sugar separated from the dry, as none of the sugar above the guard is below the draining-point.

The apparatus may be made of wood, metal, or other material, and forms a very cheap, simple, and readily-dumped drying and draining device.

Having thus described my invention, I claim as new and desire to secure by Letters Patent—

An improved sugar cooling and draining apparatus, composed of a dumping box or receptacle, with converging sides, laterally inclined bottom, and perforated inclined guard-plate, and of a perforated draining-tube at the lowermost corner of the box, and passing to the outside of the same, to be operated substantially in the manner and for the purpose specified.

JNO. G. ANGELL.

Witnesses:
RICHARD ANGELL, Jr.,
THOMAS P. DAKIN.